United States Patent
Hara et al.

(10) Patent No.: US 11,454,961 B2
(45) Date of Patent: Sep. 27, 2022

(54) PROCESSING TIME MONITORING DEVICE

(71) Applicant: FANUC CORPORATION, Yamanashi (JP)

(72) Inventors: Nobuhiro Hara, Yamanashi (JP); Yukio Kaniwa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 414 days.

(21) Appl. No.: 16/701,590

(22) Filed: Dec. 3, 2019

(65) Prior Publication Data

US 2020/0183372 A1    Jun. 11, 2020

(30) Foreign Application Priority Data

Dec. 6, 2018    (JP) .............................. JP2018-228911

(51) Int. Cl.
    *G05B 23/02*    (2006.01)
    *G06F 11/34*    (2006.01)

(52) U.S. Cl.
    CPC ....... *G05B 23/024* (2013.01); *G05B 23/0221* (2013.01); *G06F 11/3419* (2013.01)

(58) Field of Classification Search
    CPC .............. G05B 23/024; G05B 23/0221; G06F 11/3419
    USPC ........................................................ 702/183
    See application file for complete search history.

(56) References Cited

U.S. PATENT DOCUMENTS

| 11,112,768 B2 * | 9/2021 | Kubo | G06N 5/045 |
| 2019/0242788 A1 * | 8/2019 | Naohara | G01M 99/00 |
| 2019/0304286 A1 * | 10/2019 | Lee | G08B 21/18 |

FOREIGN PATENT DOCUMENTS

JP    2014-44510    3/2014

* cited by examiner

*Primary Examiner* — Aditya S Bhat
(74) *Attorney, Agent, or Firm* — Wenderoth, Lind & Ponack, L.L.P.

(57) ABSTRACT

The processing time monitoring device is intended to monitor processing time of the target device, and includes: a data acquisition unit that acquires time series data of the target device as input time series data; a time difference calculation unit that calculates a time difference between the input time series data and reference time series data, the time difference existing in a direction of a time axis; and a display unit that displays the time difference calculated by time difference calculation unit.

9 Claims, 21 Drawing Sheets

FIG. 8A

REFERENCE TIME SERIES DATA

| TIME i (ms) | 0 | 1 | 2 | 3 | 4 | 5 | 6 | 7 |
|---|---|---|---|---|---|---|---|---|
| VALUE ai | 2 | 3 | 5 | 10 | 1 | 3 | 2 | 6 |

INPUT TIME SERIES DATA

| TIME j (ms) | 0 | 1 | 2 | 3 | 4 | 5 | 6 |
|---|---|---|---|---|---|---|---|
| VALUE bj | 3 | 4 | 13 | 12 | 1 | 6 | 7 |

FIG. 9A

|    | b0     | b1     | b2     | b3     | b4     | b5     | b6     |
|----|--------|--------|--------|--------|--------|--------|--------|
| a0 | d(0,0) | d(0,1) | d(0,2) | d(0,3) | d(0,4) | d(0,5) | d(0,6) |
| a1 | d(1,0) | d(1,1) | d(1,2) | d(1,3) | d(1,4) | d(1,5) | d(1,6) |
| a2 | d(2,0) | d(2,1) | d(2,2) | d(2,3) | d(2,4) | d(2,5) | d(2,6) |
| a3 | d(3,0) | d(3,1) | d(3,2) | d(3,3) | d(3,4) | d(3,5) | d(3,6) |
| a4 | d(4,0) | d(4,1) | d(4,2) | d(4,3) | d(4,4) | d(4,5) | d(4,6) |
| a5 | d(5,0) | d(5,1) | d(5,2) | d(5,3) | d(5,4) | d(5,5) | d(5,6) |
| a6 | d(6,0) | d(6,1) | d(6,2) | d(6,3) | d(6,4) | d(6,5) | d(6,6) |
| a7 | d(7,0) | d(7,1) | d(7,2) | d(7,3) | d(7,4) | d(7,5) | d(7,6) |

FIG. 9B

|    | b0 | b1 | b2 | b3 | b4 | b5 | b6 |
|----|----|----|----|----|----|----|----|
| a0 | 1  | 2  | 11 | 10 | 1  | 4  | 5  |
| a1 | 0  | 1  | 10 | 9  | 2  | 3  | 4  |
| a2 | 2  | 1  | 8  | 7  | 4  | 1  | 2  |
| a3 | 7  | 6  | 3  | 2  | 9  | 4  | 3  |
| a4 | 2  | 3  | 12 | 11 | 0  | 5  | 6  |
| a5 | 0  | 1  | 10 | 9  | 2  | 3  | 4  |
| a6 | 1  | 2  | 11 | 10 | 1  | 4  | 5  |
| a7 | 3  | 2  | 7  | 6  | 5  | 0  | 1  |

FIG. 10A

|    | b0     | b1     | b2     | b3     | b4     | b5     | b6     |
|----|--------|--------|--------|--------|--------|--------|--------|
| a0 | g(0,0) | g(0,1) | g(0,2) | g(0,3) | g(0,4) | g(0,5) | g(0,6) |
| a1 | g(1,0) | g(1,1) | g(1,2) | g(1,3) | g(1,4) | g(1,5) | g(1,6) |
| a2 | g(2,0) | g(2,1) | g(2,2) | g(2,3) | g(2,4) | g(2,5) | g(2,6) |
| a3 | g(3,0) | g(3,1) | g(3,2) | g(3,3) | g(3,4) | g(3,5) | g(3,6) |
| a4 | g(4,0) | g(4,1) | g(4,2) | g(4,3) | g(4,4) | g(4,5) | g(4,6) |
| a5 | g(5,0) | g(5,1) | g(5,2) | g(5,3) | g(5,4) | g(5,5) | g(5,6) |
| a6 | g(6,0) | g(6,1) | g(6,2) | g(6,3) | g(6,4) | g(6,5) | g(6,6) |
| a7 | g(7,0) | g(7,1) | g(7,2) | g(7,3) | g(7,4) | g(7,5) | g(7,6) |

FIG. 10B

|    | b0 | b1 | b2 | b3 | b4 | b5 | b6 |
|----|----|----|----|----|----|----|----|
| a0 | 1  | 2  | 11 | 10 | 1  | 4  | 5  |
| a1 | 0  |    |    |    |    |    |    |
| a2 | 2  |    |    |    |    |    |    |
| a3 | 7  |    |    |    |    |    |    |
| a4 | 2  |    |    |    |    |    |    |
| a5 | 0  |    |    |    |    |    |    |
| a6 | 1  |    |    |    |    |    |    |
| a7 | 3  |    |    |    |    |    |    |

Fist, the first row and the first column are filled.

FIG. 10C

| | b0 | b1 | b2 | b3 | b4 | b5 | b6 |
|---|---|---|---|---|---|---|---|
| a0 | 1 | 2 | 11 | 10 | 1 | 4 | 5 |
| a1 | 0 | 1 | | | | | |
| a2 | 2 | | | | | | |
| a3 | 7 | | | | | | |
| a4 | 2 | | | | | | |
| a5 | 0 | | | | | | |
| a6 | 1 | | | | | | |
| a7 | 3 | | | | | | |

Cumulative distance = the minimum among cumulative distances in the upper left, upper, and left cells + distance ※ $g(i, j) = \min\{g(i-1, j), g(i-1, j-1), g(i, j-1)\} + d(i, j)$

FIG. 10D

|     | b0 | b1 | b2 | b3 | b4 | b5 | b6 |
|-----|----|----|----|----|----|----|----|
| a0  | 1  | 2  | 11 | 10 | 1  | 4  | 5  |
| a1  | 0  | 1  | 11 | 19 | 3  | 4  | 8  |
| a2  | 2  | 1  | 9  | 16 | 7  | 4  | 6  |
| a3  | 7  | 7  | 4  | 6  | 15 | 8  | 7  |
| a4  | 2  | 5  | 16 | 15 | 6  | 11 | 13 |
| a5  | 0  | 1  | 11 | 20 | 8  | 9  | 13 |
| a6  | 1  | 2  | 12 | 21 | 9  | 12 | 14 |
| a7  | 3  | 3  | 9  | 15 | 14 | 9  | 10 |

All the cumulative distances are calculated. The bottom-right cell corresponds to the end point (7,6) of the shortest route. Cumulative distance g(7,6) = 10

FIG. 11A

|    | b0 | b1 | b2 | b3 | b4 | b5 | b6 |
|----|----|----|----|----|----|----|----|
| a0 | 1  | 2  | 11 | 10 | 1  | 4  | 5  |
| a1 | 0  | 1  | 11 | 19 | 3  | 4  | 8  |
| a2 | 2  | 1  | 9  | 16 | 7  | 4  | 6  |
| a3 | 7  | 7  | 4  | 6  | 15 | 8  | 7  |
| a4 | 2  | 5  | 16 | 15 | 6  | 11 | 13 |
| a5 | 0  | 1  | 11 | 20 | 8  | 9  | 13 |
| a6 | 1  | 2  | 12 | 21 | 9  | 12 | 14 |
| a7 | 3  | 3  | 9  | 15 | 14 | 9  | 10 |

By calculating backwards from the end point of the shortest route, a next previous point is derived. The derivation is carried out through selection of a cell with the smallest value, among the upper left, upper, and left cells adjacent to the cell of interest. The result shows that (7,5) is the next previous point in the shortest route.

FIG. 11B

|    | b0 | b1 | b2 | b3 | b4 | b5 | b6 |
|----|----|----|----|----|----|----|----|
| a0 | 1  | 2  | 11 | 10 | 1  | 4  | 5  |
| a1 | 0  | 1  | 11 | 19 | 3  | 4  | 8  |
| a2 | 2  | 1  | 9  | 16 | 7  | 4  | 6  |
| a3 | 7  | 7  | 4  | 6  | 15 | 8  | 7  |
| a4 | 2  | 5  | 16 | 15 | 6  | 11 | 13 |
| a5 | 0  | 1  | 11 | 20 | 8  | 9  | 13 |
| a6 | 1  | 2  | 12 | 21 | 9  | 12 | 14 |
| a7 | 3  | 3  | 9  | 15 | 14 | 9  | 10 |

All the points in the shortest route are derived in the same manner.

FIG. 12A

REFERENCE TIME SERIES DATA $a_i$

| | a0 | a1 | a2 | a3 | a4 | a5 | a6 | a7 |
|---|---|---|---|---|---|---|---|---|
| VALUE $a_i$ | 2 | 3 | 5 | 10 | 1 | 3 | 2 | 6 |

INPUT TIME SERIES DATA AFTER DP MATCHING $b'_i$

| | b0 | b0 | b1 | b2,b3 | b4 | b4 | b4 | b5,b6 |
|---|---|---|---|---|---|---|---|---|
| VALUE $b'_j$ | 3 | 3 | 4 | 12.5 | 1 | 1 | 1 | 6.5 |

If two matching points are found, the average is calculated.

If two matching points are found, the average is calculated.

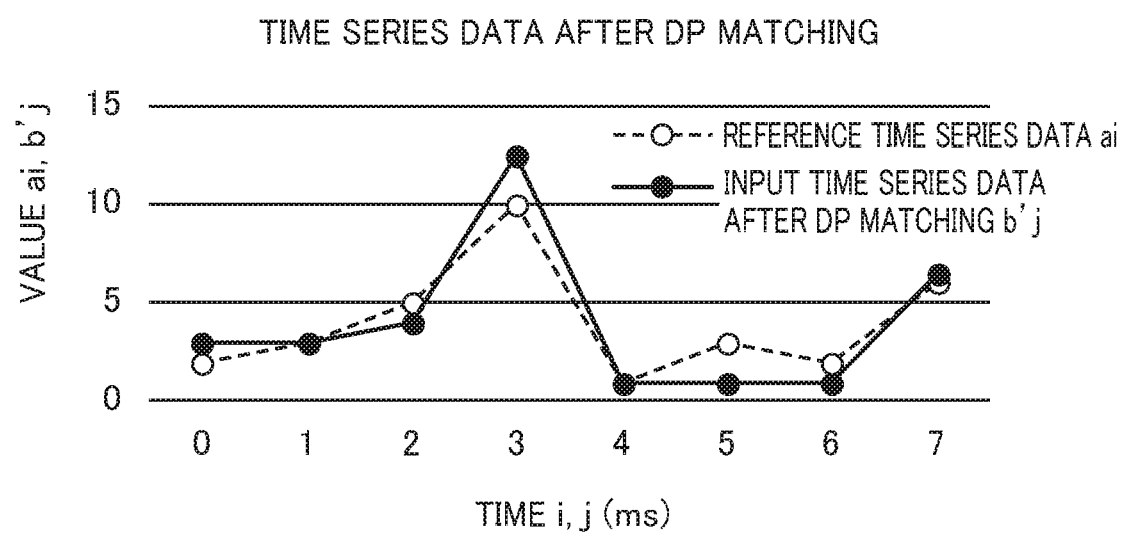

FIG. 13A

REFERENCE TIME SERIES DATA ai

| ai | a0 | a1 | a2 | a3 | a4 | a5 | a6 | a7 |
|---|---|---|---|---|---|---|---|---|
| bj | b0 | b0 | b1 | b2,b3 | b4 | b4 | b4 | b5,b6 |
| COMPENSATION VALUE i-j | 0 | 1 | 1 | 0.5 | 0 | 1 | 2 | 1.5 |

If two matching points are found, the average of "j" is calculated.

If two matching points are found, the average of "j" is calculated.

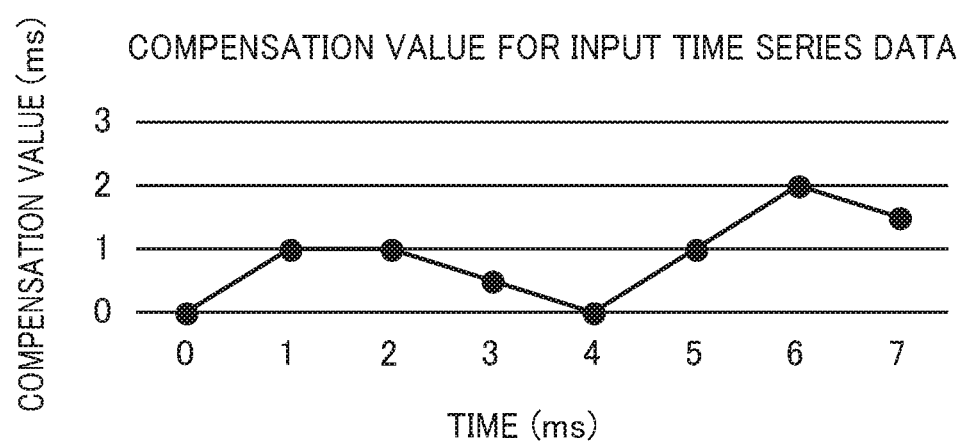

PROCESSING TIME MONITORING DEVICE

This application is based on and claims the benefit of priority from Japanese Patent Application No. 2018-228911, filed on 6 Dec. 2018, the content of which is incorporated herein by reference.

BACKGROUND OF THE INVENTION

Field of the Invention

The present disclosure relates to a device for monitoring processing time of a target device.

Related Art

Monitoring of processing time of a target device makes it possible to detect abnormality in the target device. As a device for performing such monitoring of processing time, Patent Document 1 discloses an abnormality diagnosis device for diagnosing abnormality in an apparatus. The abnormality diagnosis device calculates a degree of deviation between diagnostic input data and reference data, and determines whether or not abnormality has occurred in the apparatus based on the calculated degree of deviation. The calculation of the degree of deviation is implemented using a dynamic programming (DP) matching method.

Patent Document 1: Japanese Unexamined Patent Application, Publication No. 2014-44510

SUMMARY OF THE INVENTION

Determination of a time difference between reference time series data and time series data of a target device helps a user to detect abnormality in the target device and to estimate the cause of the abnormality.

It is an object of the present disclosure to provide a processing time monitoring device capable of informing a user of a time difference of time series data of a target device with respect to reference time series data.

A processing time monitoring device (e.g., a processing time monitoring device 1 to be described later) according to a first aspect of the present disclosure is intended to monitor processing time of a target device. The processing time monitoring device includes: a data acquisition unit (e.g., a data acquisition unit 12 to be described later) that acquires time series data of the target device as input time series data; a time difference calculation unit (e.g., a time difference calculation unit 18 to be described later) that calculates a time difference between the input time series data and reference time series data, the time difference existing in a direction of a time axis; and a display unit (e.g., a display unit 26 to be described later) that displays the time difference calculated by the time difference calculation unit.

A second aspect of the present disclosure is directed to the processing time monitoring device according to the first aspect. In the second aspect, the input time series data may be control data for controlling processing of the target device, the processing time monitoring device may further include a processing information acquisition unit (e.g., a processing information acquisition unit 20 to be described later) that acquires processing information related to the processing corresponding to the input time series data and performed by the target device, and the display unit may display a change with time in the time difference and the processing information such that the change with time and the processing information are aligned with each other relative to the time axis.

A third aspect of the present disclosure is directed to the processing time monitoring device according to the second aspect. In the third aspect, the processing time monitoring device may further includes a statistic calculation unit (e.g., a statistic calculation unit 22 to be described later) that calculates a statistic of the time difference for each data item of the input time series data, wherein the statistic is at least one of an average, a median, a maximum, a minimum, a standard deviation, or variance, and the display unit may display a change with time in the statistic.

A fourth aspect of the present disclosure is directed to the processing time monitoring device according to the third aspect. In the fourth aspect, the processing time monitoring device may further include a monitoring unit (e.g., a monitoring unit 24 to be described later) that monitors the time difference and determines whether the target device is in an abnormal state, wherein when determining that the target device is in the abnormal state, the monitoring unit may inform a user of a data item, of the input time series data, that has been determined to be abnormal and a point of abnormality in the processing information.

A fifth aspect of the present disclosure is directed to the processing time monitoring device according to any one of the first to fourth aspects. In the fifth aspect, the time difference calculation unit may calculate the time difference using a DP matching method.

A sixth aspect of the present disclosure is directed to the processing time monitoring device according to any one of the first to fifth aspects. In the sixth aspect, the processing time monitoring device may further include: a storage unit (e.g., a storage unit 14) that stores a plurality of data items of the time series data acquired by the data acquisition unit; and a reference data generation unit (e.g., a reference data generation unit 16 to be described later) that generates, as the reference time series data, any one of the plurality of data items of the time series data stored in the storage unit or average time series data obtained by averaging two or more of the plurality of data items of the time series data stored in the storage unit, the plurality of data items being historical.

A seventh aspect of the present disclosure is directed to the processing time monitoring device according to any one of the first to sixth aspects. In the seventh aspect, the processing time monitoring device may further include a data pre-processing unit (e.g., a data pre-processing unit 13 to be described later) that determines whether the input time series data is similar to the reference time series data, and excludes the input time series data from calculation processing performed by the time difference calculation unit when determining that the input time series data is not similar to the reference time series data.

An eighth aspect of the present disclosure is directed to the processing time monitoring device according to the first aspect. In the eighth aspect, the input time series data may be control data for controlling processing of the target device, the processing time monitoring device may further include a processing information acquisition unit (e.g., a processing information acquisition unit 20 to be described later) that acquires processing information related to the processing corresponding to the input time series data and performed by the target device, and the display unit may display the time difference for pieces of the processing information on a piece-by-piece basis.

A ninth aspect of the present disclosure is directed to the processing time monitoring device according to any one of the first to eighth aspects. In the ninth aspect, the input time series data and the reference time series data may be waveform data.

A tenth aspect of the present disclosure is directed to the processing time monitoring device according to the fourth aspect. In the tenth aspect, when determining that the target device is in the abnormal state, the monitoring unit may control the target device.

The present disclosure provides a processing time monitoring device capable of informing a user of a time difference of time series data of a target device with respect to reference time series data.

BRIEF DESCRIPTION OF THE DRAWINGS

FIG. 8A shows a chart of an example of reference time series data and a chart of an example of input time series data;

FIG. 9A is a chart for explaining a part of a step of a DP matching method.

FIG. 9B is a chart for explaining a part of the step of the DP matching method;

FIG. 10A is a chart for explaining a part of the step of the DP matching method;

FIG. 10B is a chart for explaining a part of the step of the DP matching method;

FIG. 10C is a chart for explaining a part of the step of the DP matching method;

FIG. 10D is a chart for explaining a part of the step of the DP matching method;

FIG. 11A is a chart for explaining a part of the step of the DP matching method;

FIG. 11B is a chart for explaining a part of the step of the DP matching method;

FIG. 12A shows a chart of an example of reference time series data and a chart of an example of input time series data after the DP matching;

FIG. 12B is a graph showing the example of reference time series data and the example of input time series data after the DP matching;

FIG. 13A is a chart showing an example of a compensation value in the direction of a time axis in the DP matching, i.e., an example of a time difference of input time series data with respect to reference time series data; and FIG. 13B is a graph showing the example of compensation in the direction of the time axis in the DP matching, i.e., the example of time difference of the input time series data with respect to the reference time series data.

DETAILED DESCRIPTION OF THE INVENTION

Figure 1:
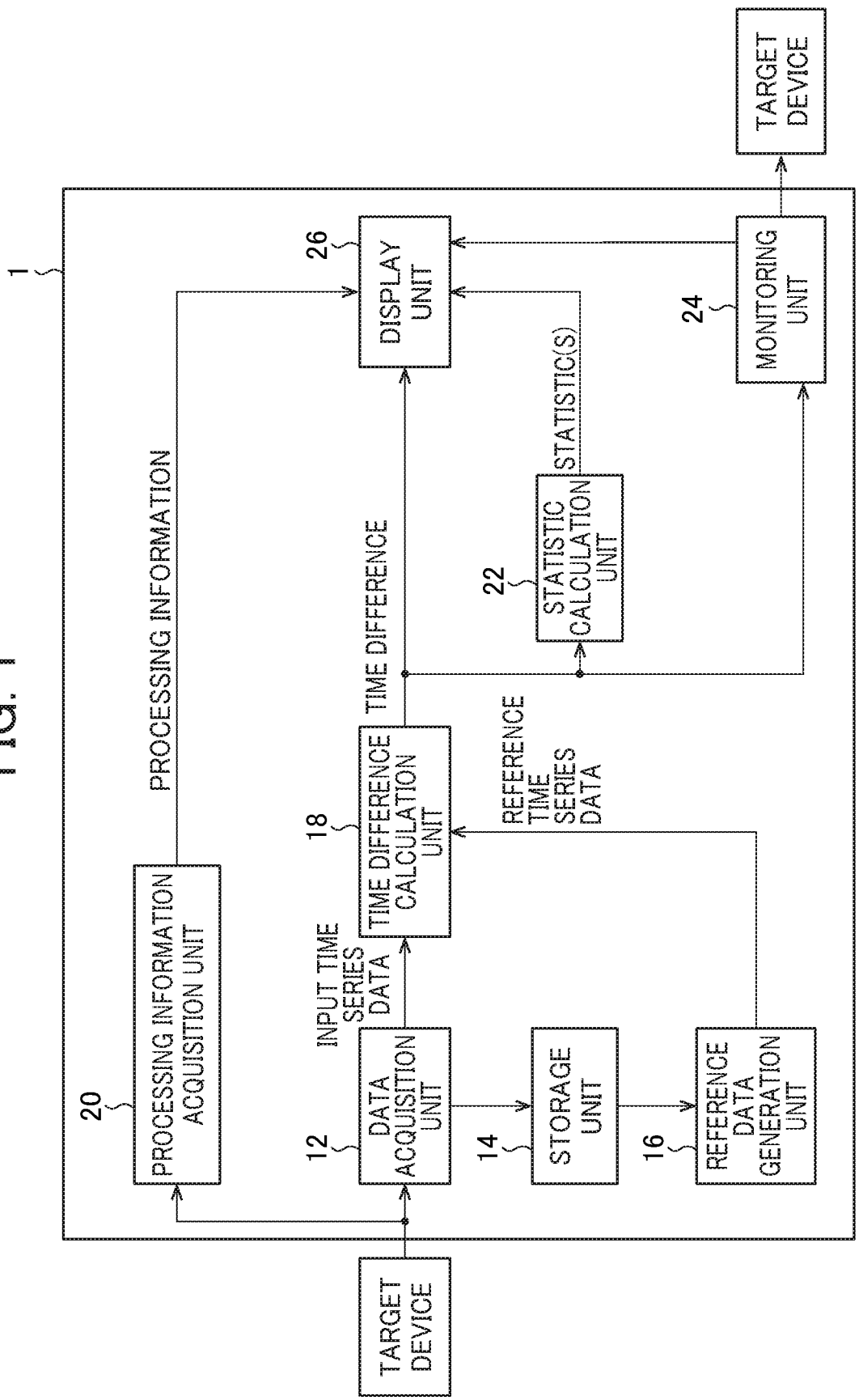
FIG. 1 is a diagram showing a configuration of a processing time monitoring device according to the present embodiment.

An exemplary embodiment of the present disclosure will be described below with reference to the accompanying drawings. In the drawings, the same or corresponding components are denoted by the same reference characters.

FIG. 1 is a diagram showing a configuration of a processing time monitoring device according to the present embodiment. The processing time monitoring device 1 shown in FIG. 1 is a device for monitoring processing time of a target device. In the present embodiment, a machine tool that cuts and machines workpieces is assumed to be the target device. The machine tool has a spindle and a feed axis, and is controlled with control data sent from a numerical control device. The processing time monitoring device 1 monitors the control data from the numerical control device, such as position information (e.g., a position command value) of each axis or torque information (e.g., a torque command value) of the spindle.

The processing time monitoring device 1 may monitor information from the machine tool, such as position information (e.g., a position feedback value) of each axis and torque information (e.g., an actual current value) of the spindle, or other signals.

The processing time monitoring device 1 includes a data acquisition unit 12, a storage unit 14, a reference data generation unit 16, a time difference calculation unit 18, a processing information acquisition unit 20, a statistic calculation unit 22, a monitoring unit 24, and a display unit 26. The processing time monitoring device 1 (excluding the storage unit 14 and the display unit 26) is comprised of an arithmetic processor such as a digital signal processor (DSP) and a field-programmable gate array (FPGA). Respective functions of the processing time monitoring device 1 (excluding the storage unit 14 and the display unit 26) are carried out through execution of predetermined software (programs and applications) stored in the storage unit, for example. The respective functions of the processing time monitoring device 1 (excluding the storage unit 14 and the display unit 26) may be carried out through cooperation of hardware and software, or may be carried out by hardware (electronic circuits) alone. The storage unit 14 is, for example, a rewritable memory such as an EEPROM. The display unit 26 is, for example, a display device such as a liquid crystal display.

The data acquisition unit 12 acquires, as input time series data (input waveform data), time series data (waveform data) of position information (e.g., a position command value or a feedback value) of each axis of the machine tool and/or torque information (e.g., a torque command value or an actual current value) of the spindle of the machine tool, from the numerical control device. It should be noted that the data acquisition unit 12 may acquire not only the data from the outside, but also data of the inside of the system.

The storage unit 14 stores a plurality of data items of the time series data acquired by the data acquisition unit 12.

The reference data generation unit 16 generates reference time series data, based on time series data of past normal operation, the time series data being stored in the storage unit 14. For example, the reference data generation unit 16 may set, as the reference time series data (reference waveform data), any one of a plurality of historical data items of the time series data stored in the storage unit 14. Alternatively, the reference data generation unit 16 may generate, as the reference time series data (reference waveform data), an average time series data obtained by averaging two or more of the plurality of historical data items of the time series data stored in the storage unit 14.

Figure 2:
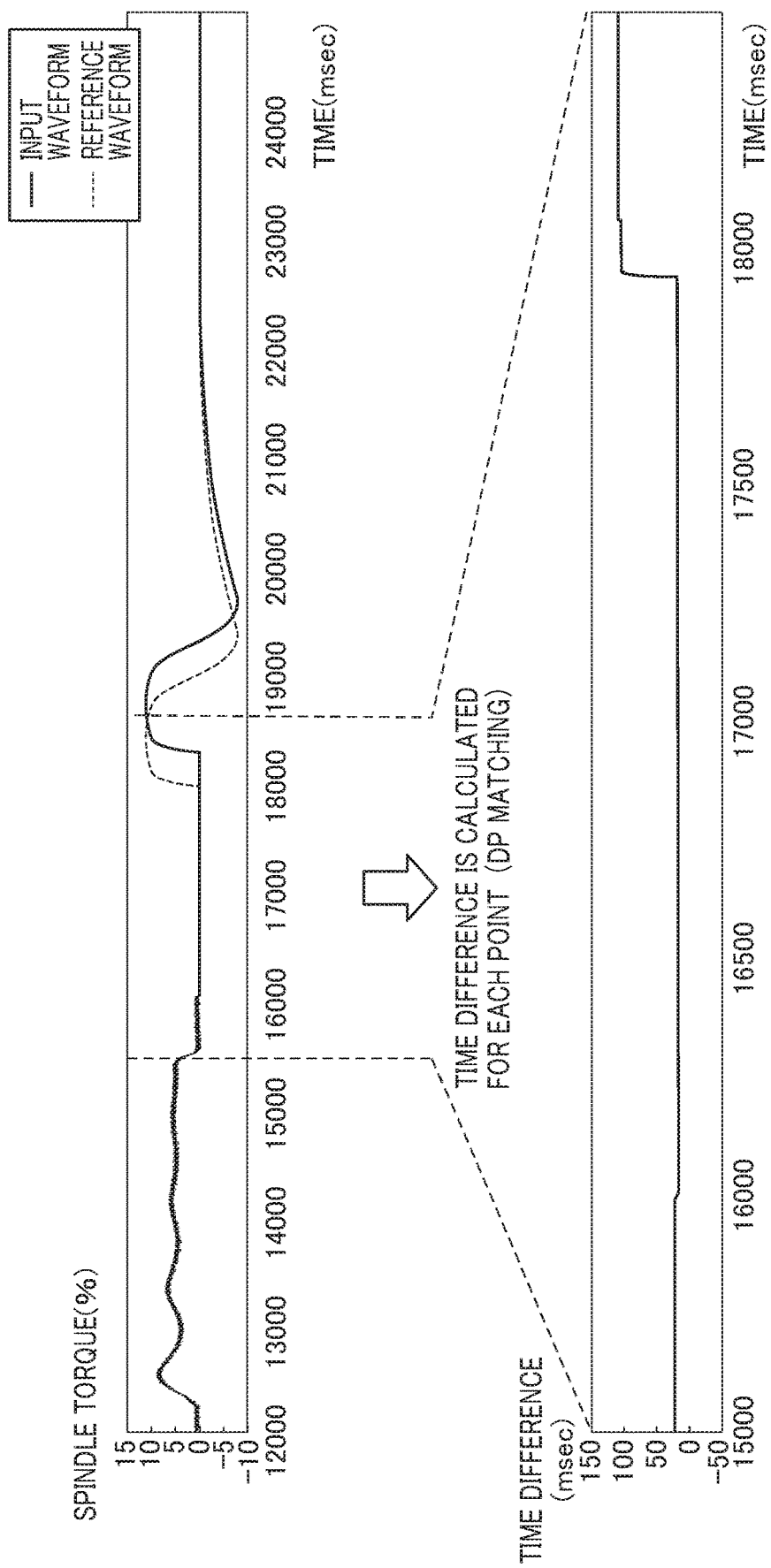
FIG. 2 is a diagram for explaining an example of calculation of a time difference.

The time difference calculation unit 18 calculates a time difference between the input time series data acquired by the data acquisition unit 12 and the reference time series data generated by the reference data generation unit 16, the time difference existing in a direction of a time axis. FIG. 2 is a diagram for explaining an example of calculation of the time difference. In FIG. 2, the upper portion shows an input waveform (input time series data; the solid line) that represents a torque command of the spindle, and a reference waveform (reference time series data; the dashed line). For example, the time difference calculation unit 18 calculates a time difference of the input time series data with respect to the reference time series data, as shown in the lower portion of FIG. 2.

The time difference calculation unit 18 calculates the time difference of the input time series data with respect to the reference time series data by using, for example, a pattern matching method (elastic matching method), in particular, a dynamic programming (DP) matching method. Details of the calculation of the time difference using the DP matching method will be described later.

Figure 3:
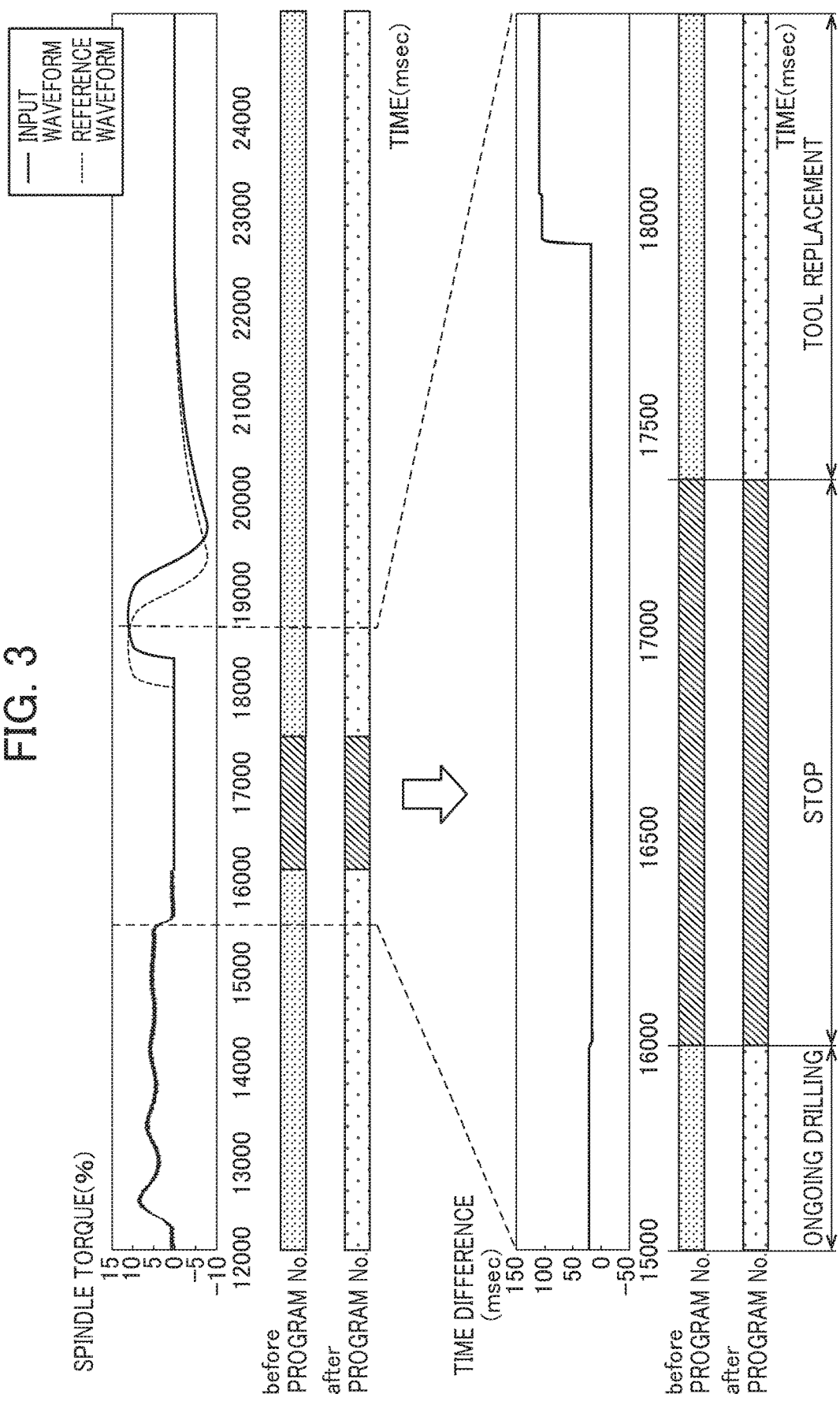
FIG. 3 is a diagram for explaining an example of processing information related to processing corresponding to input time series data and performed by a machine tool.

If the input time series data is control data (e.g., a position command value of each axis or a torque command value of the spindle) for controlling the processing of the machine tool, the processing information acquisition unit 20 acquires processing information (e.g., a phase of processing, a machining status, and other signals) related to the processing corresponding to the input time series data and performed by the machine tool. FIG. 3 is a diagram for explaining an example of the processing information related to processing that the machine tool performs in correspondence with time series data. As shown in FIG. 3, the processing information acquisition unit 20 acquires, as the processing information related to the processing that the machine tool performs in correspondence with the time series data, phases of the processing (machining status) in a processing program, namely, ongoing, stop, tool replacement, and the like.

Figure 4:
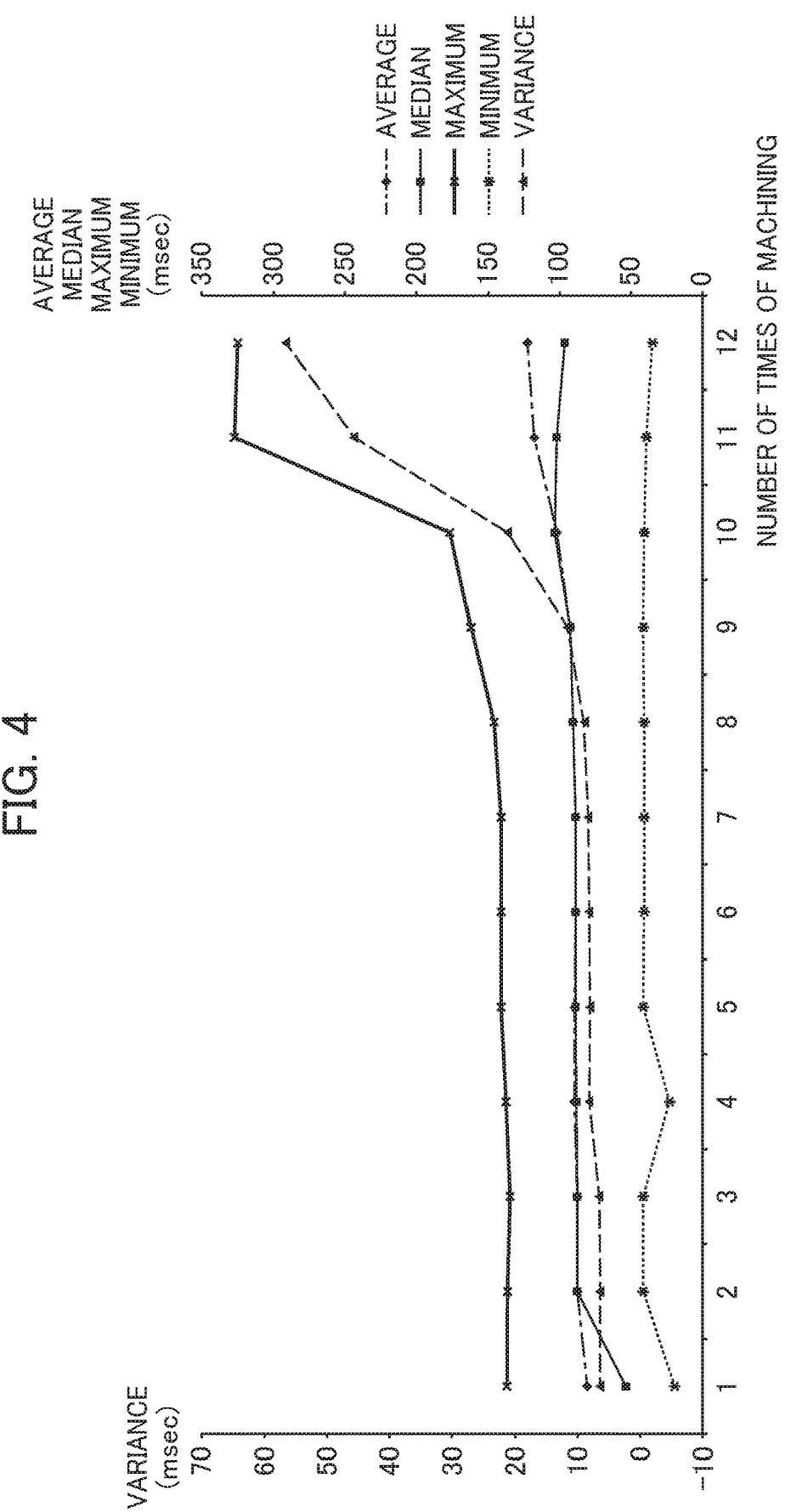
FIG. 4 is a graph for explaining exemplary calculation of statistics of a time difference.

The statistic calculation unit 22 calculates and records statistics (e.g., an average, a median, a maximum, a minimum, a standard deviation, variance, etc.) of the time difference calculated by the time difference calculation unit 18 for each data item of the input time series data. FIG. 4 is a graph for explaining exemplary calculation of the statistics of the time difference. As shown in FIG. 4, the statistic calculation unit 22 calculates statistics of the time difference, such as an average, a median, a maximum, a minimum, variance, and the like, for each data item of the input time series data.

Figure 5:
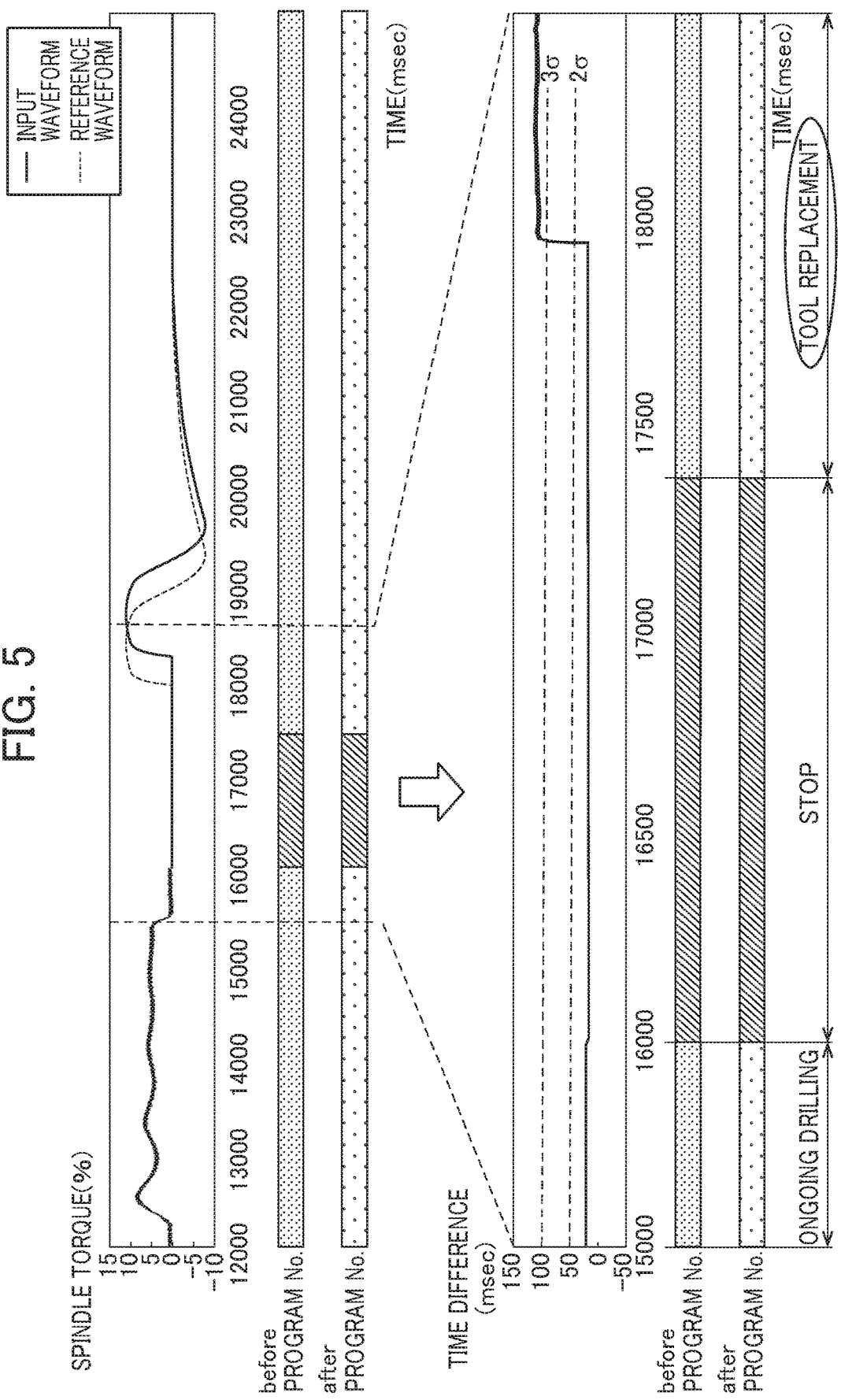
FIG. 5 is a diagram for explaining an example of monitoring of a time difference.

The monitoring unit 24 monitors (diagnoses) the time difference calculated by the time difference calculation unit 18 to determine whether the machine tool is in an abnormal state. FIG. 5 is a diagram for explaining an example of monitoring of a time difference. As shown in FIG. 5, the monitoring unit 24 determines that the machine tool is in a warning state when, for example, the time difference is equal to or larger than a threshold 2*a* (a standard deviation or a fixed value), and determines that the machine tool is in an abnormal state when, for example, the time difference is equal to or larger than a threshold 3*a* (a standard deviation or a fixed value).

When determining that the machine tool is in the abnormal state, the monitoring unit 24 informs the user of the input time series data determined to be abnormal (i.e., at which data item of the input time series data the abnormality has been detected: for example, the number of times of machining, the workpiece ID, the starting time and ending time of the data item) in combination with a point of abnormality (causal point) in the processing information. For example, as shown in FIG. 5, the display unit 26 is used to make the display attributes (the type, thickness, and color of a line, etc.) of the point of abnormality different from those of the other portion, the point of abnormality being present in a change with time in the time difference corresponding to the data item, of the input time series data, that has been determined to be abnormal. Alternatively, the display unit is used to convert the processing information into a form of information recognizable by the user (e.g., character information such as "ongoing", "stop", and "tool replacement"), to make the display attributes (the thickness and color of the characters, enclosure line, etc.) of the point of abnormality in the processing information different from those of the other portion. This feature makes it possible to inform the user of the data item, of the input time series data, at which the abnormality has been detected and of the phase of machining which is presumed to be the point of the abnormality (causal point).

In addition, when determining that the machine tool is in the abnormal state, the monitoring unit 24 transmits a command to the machine tool or the numerical control device to control the machine tool. For example, the monitoring unit 24 may deactivate the machine tool or provide feedback to the behavior of the machine tool.

The display unit 26 displays the time difference calculated by the time difference calculation unit 18. For example, as shown in FIG. 2 (the lower portion), the display unit 26 displays a change with time in the time difference.

When the input time series data is control data (e.g., a position command value of each axis or a torque command value of the spindle) for controlling the processing of the machine tool, the display unit 26 displays the time difference calculated by the time difference calculation unit 18 and the processing information (e.g., a phase of the processing, a machining status, and other signals) related to the processing corresponding to the input time series data acquired by the processing information acquisition unit 20 and performed by the machine tool, such that the time difference and the processing information are aligned with each other relative to the time axis. For example, as shown in FIG. 3 (the lower portion), the display unit 26 displays the change with time in the time difference and the machining information (ongoing, stop, tool replacement, etc.) related to the processing of the machine tool such that the change with time and the machining information are aligned with each other relative to the time axis. The machining information related to the processing of the machine tool and displayed on the display unit 26 may be a code number itself in the machining program, or may be character information easily recognizable by the user. Displaying the change with time in the time difference in combination with the machining information (processing information) in this manner makes it possible for the user to determine in which part of the machining the time difference exists and how much the time difference is.

The display unit 26 further displays a change with time in the statistics, of the time difference, that have been calculated by the statistic calculation unit 22. For example, as shown in FIG. 4, the display unit 26 displays the statistics, such as the average, the median, the maximum, the minimum, the variance, and the like, of time difference for each data item of the input time series data. In FIG. 4, the horizontal axis represents the number of times of machining. That is, FIG. 4 shows how much the statistics change with time. From FIG. 4, the tendency for the time difference to change is observed, the tendency resulting from repetition of machining.

When the monitoring unit 24 determines that the machine tool is in the abnormal state, the display unit 26 displays the data item, of the input time series data, determined to be abnormal (i.e., at which data item of the input time series data the abnormality has been detected: for example, the number of times of machining, the workpiece ID, the starting time and ending time of the data item) in combination with the point of abnormality (causal point) in the processing information. For example, as shown in FIG. 5 (the lower portion), the display unit 26 may display the point of abnormality (causal point) by means of display attributes (the type, thickness, and color of a line, etc.) differing from those of the other portion, the point of abnormality (causal point) being present in the change with time in the time difference corresponding to the data item, of the input time series data, that has been determined to be abnormal. Alternatively, the display unit 26 may convert the processing information into a form of information recognizable by the user (e.g., character information such as "ongoing", "stop", and "tool replacement"), and may display the point of abnormality (causal point) in the processing information by means of display attributes (the thickness and color of the characters, enclosure line, etc.) differing from those of the other portion.

Figure 6:
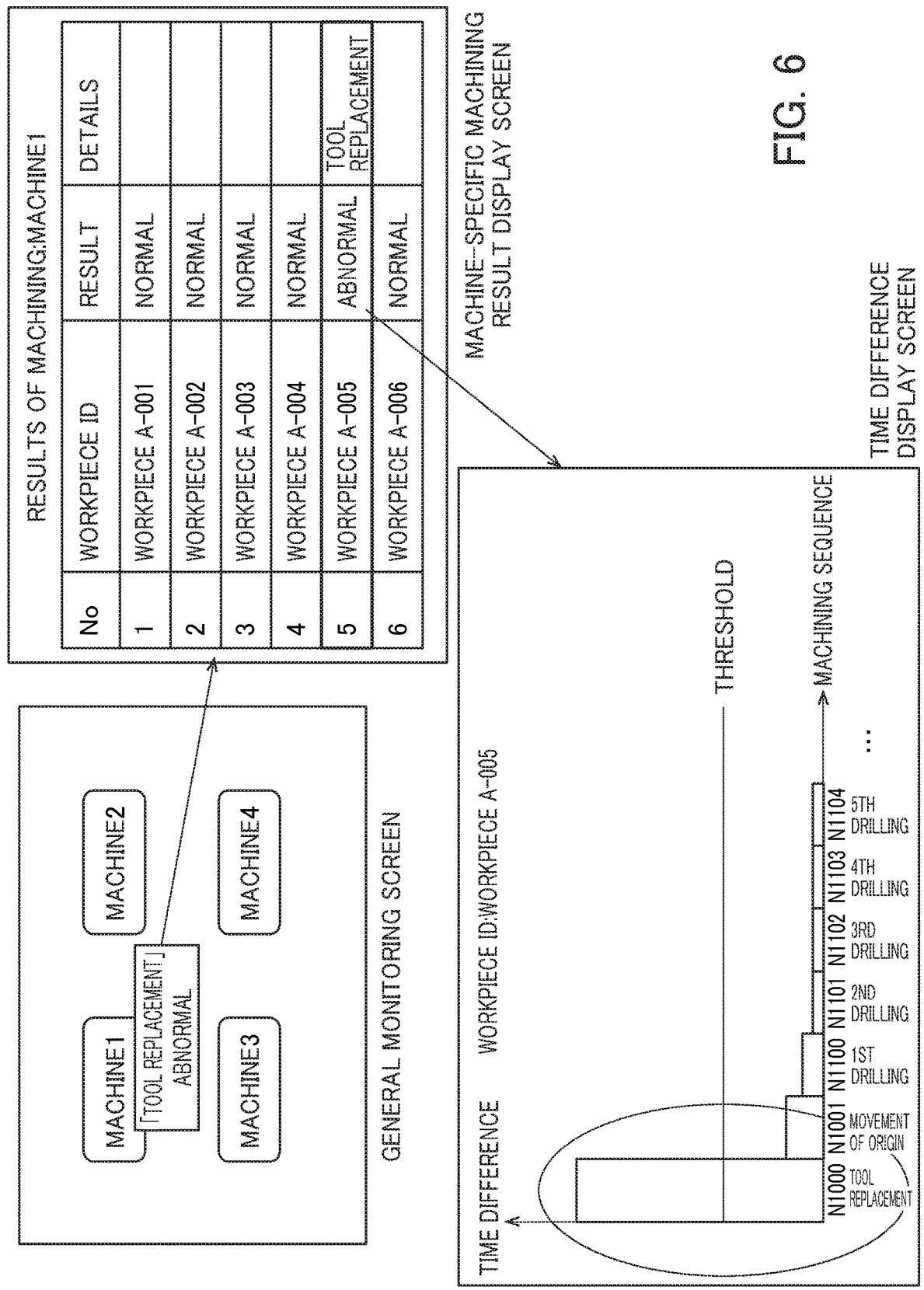
FIG. 6 is a diagram showing an example of display.

Moreover, the display unit 26 may display the time difference, which has been calculated by the time difference calculation unit 18, for pieces of the processing information acquired by the processing information acquisition unit 20 on a piece-by-piece basis. FIG. 6 is a diagram showing an example of display. As shown in FIG. 6 (the upper left portion; a general monitoring screen), when the monitoring unit 24 detects abnormality, the display unit 26 displays the presence or absence of abnormality on a machine-by-machine basis (for each of the machine tools). Here, the user selects "MACHINE 1", which is in an abnormal state.

Then, as shown in FIG. 6 (the upper right portion), the display unit 26 displays the machining results (processing results) of the workpieces machined by MACHINE 1 on a one-by-one basis. In FIG. 6, the machining results (normal or abnormal) of the workpieces A-001 to A-006 are displayed. In the row of the workpiece A-005 determined to be abnormal, the details of the abnormality (processing information: tool replacement) are displayed (machine-specific machining result display screen). Here, the user selects the workpiece A-005 that is in an abnormal state.

Then, as shown in FIG. 6 (the lower left portion), the display unit 26 displays the time differences in the machining of the workpiece A-005, the time differences having been calculated by the time difference calculation unit 18 and being displayed for pieces of the processing information acquired by the processing information acquisition unit 20 on a piece-by-piece basis. In FIG. 6, the pieces of the processing information are sorted and displayed in descending order. In FIG. 6, the threshold at the time when the abnormality was determined is displayed.

FIG. 6 shows the bar graph as a nonlimiting example. For example, the time differences may be displayed in the form of a line graph. Although the pieces of the processing information are sorted in descending order in FIG. 6, the present disclosure is not limited thereto. For example, the pieces of the processing information may be sorted in ascending order or in chronological order. The time difference may be any one of the average, the median, the maximum, the minimum, the standard deviation, the variance, and the like of each piece of the processing information.

In this manner, the time differences only in a particular range extracted based on the processing information may be displayed. As a result, the user can recognize at a glance the point of abnormality in the machining sequence of each workpiece.

As described above, the processing time monitoring device 1 of the present embodiment calculates a time difference between the input time series data (input waveform; e.g., position information of each axis or the torque information) acquired from the numerical control device that controls the machine tool and the reference time series data (reference waveform; e.g., time series data obtained in normal operation or average time series data), and displays a change with time in the calculated time difference and the processing information of the machine tool such that the change with time and the processing information are aligned with each other relative to a time axis, thereby providing information useful for detecting abnormality in the machine tool and for estimating the cause of the abnormality. As a result, the user can notice, for example, the following information.

Detection of abnormality in a portion which is not measured directly
(e.g., aging change in auxiliary functions of the numerical control device, such as tool change function, etc.);

Identification of a point, in the machining program, at which abnormality has occurred; and Influence of a change of the program on cycle time.

The processing time monitoring device 1 of the present embodiment, which adopts the abnormality detection approach focusing on the time difference of the input time series data (input waveform) with respect to the reference time series data (reference waveform), is capable of not only detecting abnormality in a portion that is directly measured, but also indirectly detecting abnormality in a portion that is not directly measured. For example, the processing time monitoring device 1 makes it possible to detect abnormality, such as degradation of tool replacement function, abnormality in a coolant device, abnormality in an air supply device, and abnormality occurring at the time of opening and closing a door for supplying workpieces. In addition, the processing time monitoring device 1 of the present embodiment, which adopts the approach in which a change in a time difference in a machining process is displayed in combination with the machining information (processing information), makes it possible for the user to determine in which part of the respective machining process the time difference exists and how much the time difference is. (A method in which the time required for each machining process is simply displayed does not make it possible to determine in which part of the respective machining process a time difference exists and how much the time difference is.)

(Modification)

Figure 7:
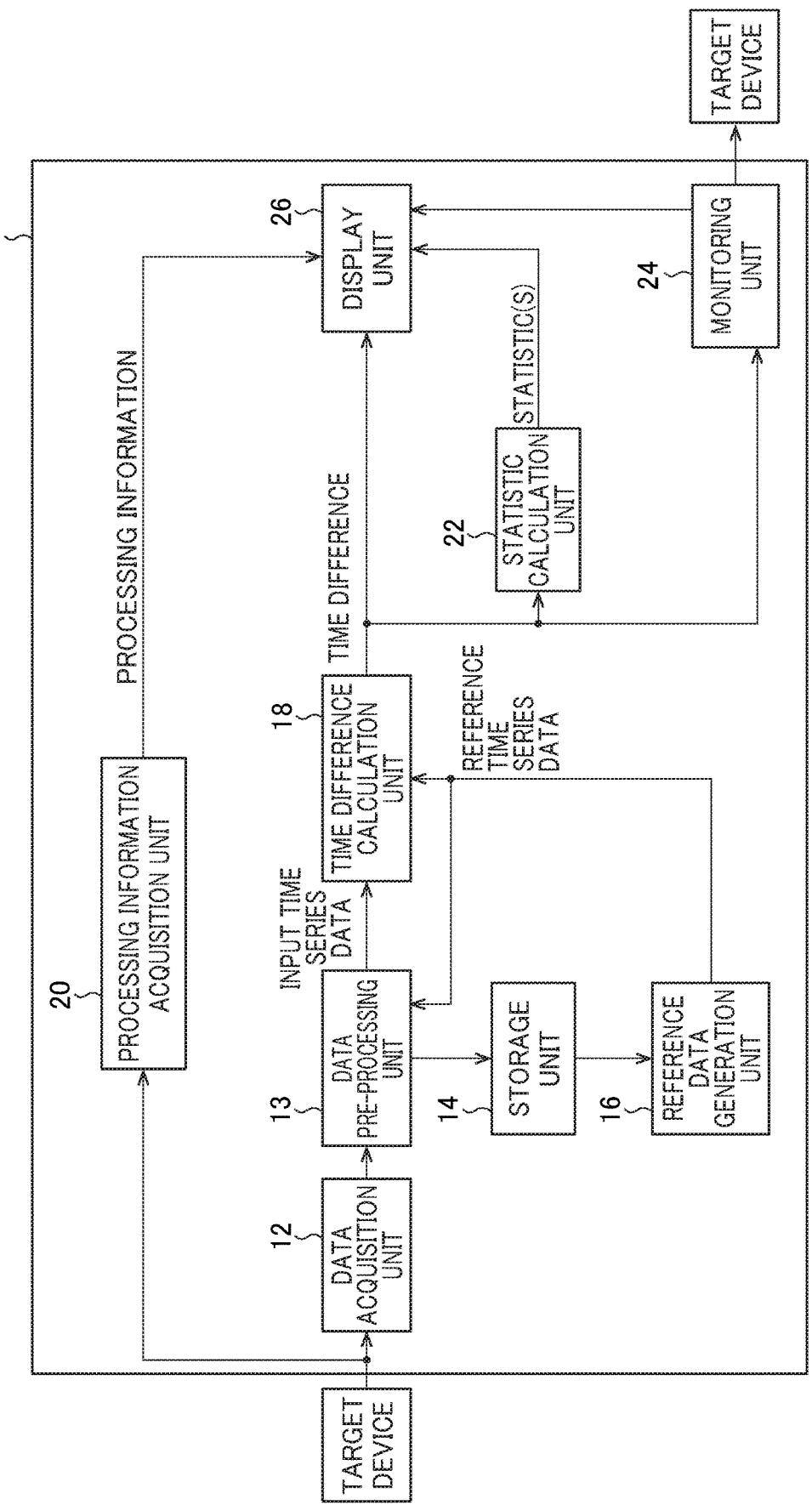
FIG. 7 is a diagram showing a configuration of a processing time monitoring device according to a modification of the present embodiment.

FIG. 7 is a diagram showing a configuration of a processing time monitoring device according to a modification of the present embodiment. The processing time monitoring device 1 of the modification shown in FIG. 7 includes, in addition to the components of the processing time monitoring device 1 shown in FIG. 1, a data pre-processing unit 13, which constitutes a difference between the modification and the above-described embodiment.

The data pre-processing unit 13 determines whether input time series data acquired by the data acquisition unit 12 is similar to reference time series data. For example, the data pre-processing unit 13 calculates a degree of similarity between the input time series data and the reference time series data (see below), determines that the input time series data is similar to the reference time series data if the calculated degree of similarity is equal to or greater than a threshold, and determines that the input time series data is not similar to the reference time series data if the calculated degree of similarity is less than the threshold.

(Calculation of Degree of Similarity)

First, like the statistic calculation unit 22 described above, the data pre-processing unit 13 calculates, as a reference quantity, statistics (e.g., an average, a standard deviation, a maximum, and a minimum) of reference time series data or those of average time series data obtained by averaging all of acquired historical data. In addition, the data pre-processing unit 13 calculates statistics (e.g., an average, a standard deviation, a maximum, and a minimum) of the acquired time series data, in the same manner as of the statistic calculation unit 22 described above. Averaging the time series data acquired by the data acquisition unit 12 reduces the effect of noise in a case where the input time series data includes much noise. As a result, the accuracy of the processing for calculating the time difference can be improved.

Next, the data pre-processing unit 13 calculates a degree of individual similarity of each of the statistics, according to the following formulas.

Degree of individual similarity (average)=1/(1+|(time series data statistic (average)−reference quantity (average))/reference quantity (average)|×4)

Degree of individual similarity (standard deviation) =1/(1+|(time series data statistic (standard deviation)−reference quantity (standard deviation))/reference quantity (standard deviation)|× 4)

Degree of individual similarity (maximum)=1/(1+| (time series data statistic (maximum)−reference quantity (maximum))/reference quantity (maximum)|×4)

Degree of individual similarity (minimum)=1/(1+| (time series data statistic (minimum)−reference quantity (minimum))/reference quantity (minimum)|×4)

Next, the data pre-processing unit 13 averages the degrees of individual similarity of the statistics, according to the following formula, thereby determining a degree of similarity.

Degree of similarity=(Degree of individual similarity (average)+Degree of individual similarity (standard deviation)+Degree of individual similarity (maximum)+Degree of individual similarity (minimum))/4×100

Note that the degree of similarity may be expressed as a number satisfying (0,100], instead of a percentage. If a denominator of the formula of a degree of individual similarity is 0, the degree of individual similarity does not need to be calculated. In such a case, the denominator "4" in the formula for calculating the degree of similarity is suitably changed to the number of the degrees of individual similarity (the number of numerators) that have been eventually calculated. In a case where the calculation of even one of the degrees of individual similarity is impossible, the degree of similarity is determined to be "nil".

If the calculated degree of similarity is greater than or equal to the threshold, i.e., if the determined time series data is similar to the reference time series data, the data pre-processing unit 13 supplies the time series data acquired by the data acquisition unit 12 to the time difference calculation unit 18. In this manner, the data pre-processing unit 13 includes the acquired time series data in the calculation processing performed by the time difference calculation unit 18.

On the other hand, if the calculated degree of similarity is less than the threshold or if the degree of similarity is "nil", i.e., if the acquired time series data is not similar to the reference time series data, the data pre-processing unit 13 does not supply the time series data acquired by the data acquisition unit 12 to the time difference calculation unit 18. In this manner, the data pre-processing unit 13 excludes the acquired time series data from the calculation processing performed by the time difference calculation unit 18. For example, in a case where the input time series data and the reference time series data have been generated in different phases of machining, or with respect to workpieces having different shapes, the input time series data is not similar to the reference time series data.

(Calculation of Time Difference by DP Matching Method)

Figure 8B:
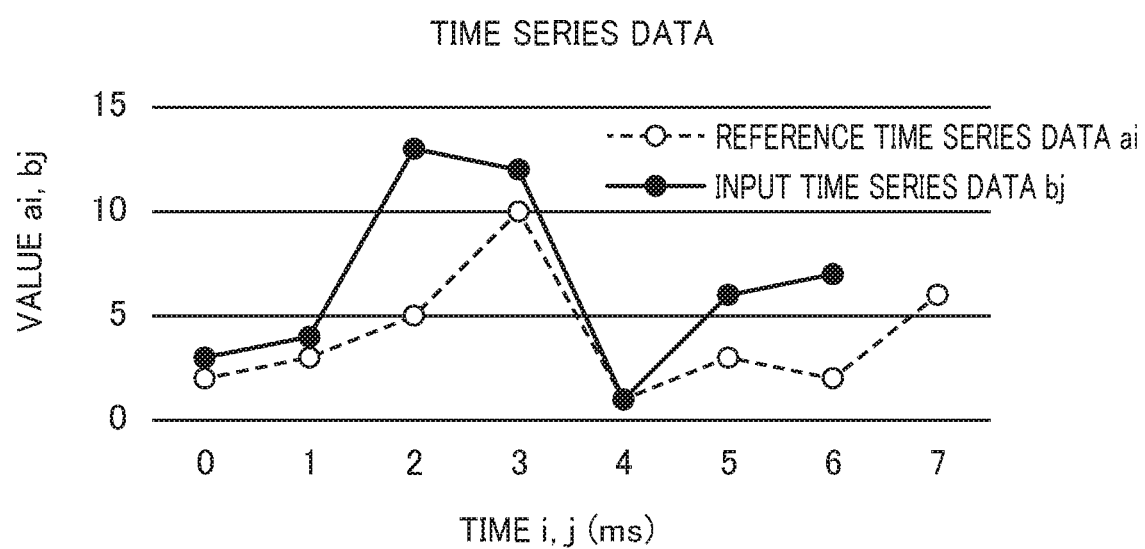
FIG. 8B is a graph showing the example of reference time series data and the example of input time series data.

Calculation of the time difference of the time series data with respect to the reference time series data will be described in detail with reference to a specific example, the calculation being performed by the time difference calculation unit 18 according to the DP matching method. In this example, the reference time series data ai ("i" is time) and the input time series data bj ("j" is time) are shown in FIGS. 8A and 8B. In this example, the time series data ai, which has the larger number of points, is defined as the reference time series data.

First, as shown in FIG. 9A, distances d(i,j) of the respective points (time) of both data are calculated according to the following formula in a round-robin manner. The results are shown in FIG. 9B.

$$d(i,j)=|ai-bj|$$

Next, as shown in FIG. 10A, cumulative distances g(i,j) of the respective points (time) of both data are calculated according to the following formula.

$$g(i,j)=\min\{g(i-1,j),g(i-1,j-1),g(i,j-1)\}+d(i,j)=\text{the minimum among the cumulative distances in the upper left, upper, and left cells+distance}$$

First, as shown in FIG. 10B, the first row and the first column are filled. Next, as shown in FIG. 10C, the cumulative distances g(i,j) are calculated in order, according to the above formula. FIG. 10D shows the results of calculation of all the cumulative distances. In FIG. 10D, the bottom-right cell corresponds to the end point (7,6) of the shortest route, and the cumulative distance g(7,6) of the end point is equal to 10.

Next, the shortest route is derived. As shown in FIG. 11A, by calculating backwards from the end point of the shortest route, a next previous point is derived. The derivation is carried out through selection of a cell with the smallest value, among the upper left, upper, and left cells adjacent to the cell of interest. In FIG. 11A, (7,5) is the next previous point in the shortest route. FIG. 11B shows the results of the derivation, i.e., all the derived points in the shortest route.

Next, the matching is conducted on both data. The ai and bj of each cell of the shortest route shown in FIG. 11B match with each other. The input time series data b'j after the DP matching is shown in FIGS. 12A and 12B. When two matching points are found, the average value of the two points is calculated.

Next, a compensation value i-j in the direction of the time axis of the input time series data b'j after the DP matching is calculated. When two matching points are found, the average value of the two points is calculated. The results are shown in FIGS. 13A and 13B. The compensation value in the direction of the time axis in the DP matching is defined as the time difference of the input time series data with respect to the reference time series data.

In this way, the DP matching method is used to determine a correspondence with which a distance-cost between the reference time series data and the input time series data is minimized, so that the time differences at the respective points of the input time series data can be determined.

The embodiment of the present disclosure has been described above. However, the present disclosure is not limited to the embodiment described above, and various modifications and variations can be made. For example, the device exemplified in the above embodiment is configured to monitor the time differences of the input time series data, i.e., the position command information or the position feedback information of each axis, or the torque command information or the actual current feedback information of the spindle of the machine tool that performs machining processing. However, the present disclosure is not limited to this, but is applicable to various processing devices such as a PC, a USB memory, and an external storage.

In the embodiment described above, the machine tool for cutting and machining workpieces and the numerical control device have been exemplified. However, the present disclosure is not limited to this, but is applicable to various machines. The processing time monitoring device may monitor, for example, status data of a machine or a workpiece, such as the information related to the operation state of the machine or the information related to the machining state of the workpiece, instead of the control data (the command value and the feedback value) from the numerical control device. For example, in the case of a wire electrical discharge machine, examples of the information related to the operation state of the machine include a current, a voltage, a room temperature, a water temperature, and other signals. In this case, it is possible to detect abnormality such as wear of an electrode pin and clogging of a nozzle. Further, for example, in the case of an injection molding machine, examples of information related to the operation state of the machine include a current, a voltage, a room temperature, a water temperature, an oil temperature, and other signals. In this case, it is possible to detect abnormality such as a fault of a heater, faulty contact of a contactor, and the like.

EXPLANATION OF REFERENCE NUMERALS

1 Processing Time Monitoring Device
12 Data Acquisition Unit
13 Data Pre-processing Unit
14 Storage Unit
16 Reference Data Generation Unit
18 Time Difference Calculation Unit
20 Processing Information Acquisition Unit
22 Statistic Calculation Unit
24 Monitoring Unit
26 Display Unit

What is claimed is:

1. A processing time monitoring device for monitoring processing time of a target device, the processing time monitoring device comprising:
a data acquisition unit that acquires time series data of the target device as input time series data;
a time difference calculation unit that calculates a time difference between the input time series data and reference time series data, the time difference existing in a direction of a time axis; and
a display unit that displays the time difference calculated by the time difference calculation unit,
wherein the target device is a machine, and
wherein the input time series data is control data for controlling processing of the target device,
the processing time monitoring device further comprises a processing information acquisition unit that acquires processing information related to the processing corresponding to the input time series data and performed by the target device, and
the display unit displays a change with time in the time difference and the processing information such that the change with time and the processing information are aligned with each other relative to the time axis.

2. The processing time monitoring device according to claim 1, further comprising:
a statistic calculation unit that calculates a statistic of the time difference for each data item of the input time series data, wherein
the statistic is at least one of an average, a median, a maximum, a minimum, a standard deviation, or variance, and
the display unit displays a change with time in the statistic.

3. The processing time monitoring device according to claim 2, further comprising:
a monitoring unit that monitors the time difference and determines whether the target device is in an abnormal state, wherein
when determining that the target device is in the abnormal state, the monitoring unit informs a user of a data item, of the input time series data, that has been determined to be abnormal and a point of abnormality in the processing information.

4. The processing time monitoring device according to claim 3, wherein when determining that the target device is in the abnormal state, the monitoring unit controls the target device.

5. The processing time monitoring device according to claim 1, wherein the time difference calculation unit calculates the time difference using a DP matching method.

6. The processing time monitoring device according to claim 1, further comprising:
a storage unit that stores a plurality of data items of the time series data acquired by the data acquisition unit; and
a reference data generation unit that generates, as the reference time series data, any one of the plurality of data items of the time series data stored in the storage unit or average time series data obtained by averaging two or more of the plurality of data items of the time series data stored in the storage unit, the plurality of data items being historical.

7. The processing time monitoring device according to claim 1, further comprising:
a data pre-processing unit that determines whether the input time series data is similar to the reference time series data, and excludes the input time series data from calculation processing performed by the time difference calculation unit when determining that the input time series data is not similar to the reference time series data.

8. The processing time monitoring device according to claim 1, wherein the display unit displays the time difference for pieces of the processing information on a piece-by-piece basis.

9. The processing time monitoring device according to claim 1, wherein the input time series data and the reference time series data are waveform data.

\* \* \* \* \*